(12) United States Patent
Phillips

(10) Patent No.: US 7,826,683 B2
(45) Date of Patent: Nov. 2, 2010

(54) DIRECTIONAL FEATHERING OF IMAGE OBJECTS

(75) Inventor: Matthew J. Phillips, Champaign, IL (US)

(73) Assignee: Adobe Systems Incorporated, San Jose, CA (US)

( * ) Notice: Subject to any disclaimer, the term of this patent is extended or adjusted under 35 U.S.C. 154(b) by 1048 days.

(21) Appl. No.: 11/580,381

(22) Filed: Oct. 13, 2006

(65) Prior Publication Data

US 2008/0089608 A1    Apr. 17, 2008

(51) Int. Cl.
G06K 9/20 (2006.01)
G06K 9/34 (2006.01)
G06K 9/36 (2006.01)
G06K 9/40 (2006.01)
G09G 5/00 (2006.01)

(52) U.S. Cl. .................. 382/283; 382/173; 382/266; 382/276; 382/291; 345/622; 345/626

(58) Field of Classification Search .................. 382/276
See application file for complete search history.

(56) References Cited

U.S. PATENT DOCUMENTS

| | | | |
|---|---|---|---|
| 4,855,934 A | 8/1989 | Robinson | |
| 5,022,085 A * | 6/1991 | Cok | 382/284 |
| 5,301,038 A | 4/1994 | Todd | |
| 5,768,438 A * | 6/1998 | Etoh | 382/251 |
| 5,912,672 A | 6/1999 | Liguori | |
| 6,269,195 B1 | 7/2001 | Gonsalves | |
| 6,421,460 B1 | 7/2002 | Hamburg | |
| 6,456,295 B1 | 9/2002 | Schiller | |
| 6,973,220 B2 * | 12/2005 | Sakurai et al. | 382/266 |
| 7,336,851 B1 * | 2/2008 | Cote | 382/282 |

* cited by examiner

Primary Examiner—Anand Bhatnagar
Assistant Examiner—Jose M Torres
(74) Attorney, Agent, or Firm—Fish & Richardson P.C.

(57) ABSTRACT

This specification describes technologies relating to directional feathering of an image object. In general, one aspect of the subject matter described in this specification can be embodied in a method that includes obtaining an image object and directional information for the image object, the object including a shape having edges. The method also includes creating an opacity mask for the image object based on the shape of the image object. The method further includes processing the opacity mask such that opacity values in the opacity mask are different going from edge to interior of the shape and the opacity mask is processed in accordance with the directional information of the image object. Additionally, the method includes outputting a composite image based on the image object and the opacity mask.

42 Claims, 9 Drawing Sheets

Leading-edge only mode    All edges mode

Original object | Resulting mask image with +45° applied | Mask is processed normally | Original object composited with -45° rotated mask

DIRECTIONAL FEATHERING OF IMAGE OBJECTS

BACKGROUND

The present disclosure relates to image editing; in particular, directional feathering of image objects.

Feathers, also called vignettes, are commonly used in graphics layouts to impart special effects on image objects. These image objects may be digital images or texts and lines in either vector-based formats or raster-based formats. Feathering creates an effect where the image object has a "feathered edge" that blends smoothly into underlying objects. When two slightly overlapping images are placed side by side without blending; there can be a sharp and abrupt boundary between the images. In many graphics layout applications, it is preferable that the two images blend smoothly together so that no distinct intersection or boundary is perceived.

In some graphics layout, only one edge of the image object needs to be feathered. For example, when two images are placed in the same column, there is a need to blend the top image with the bottom image. It is then desirable to feather only the bottommost edge of the top image so that it will blend into the bottom image. However, existing automated feathering tools are generally non-directional and typically feather all edges of an image object equally.

SUMMARY

This specification describes technologies relating to directional feathering of an image object. In general, one aspect of the subject matter described in this specification can be embodied in a method that includes obtaining an image object and directional information for the image object, the object including a shape having edges. The method also includes creating an opacity mask for the image object based on the shape of the image object. The method further includes processing the opacity mask such that opacity values in the opacity mask are different going from edge to interior of the shape and the opacity mask is processed in accordance with the directional information of the image object. Additionally, the method includes outputting a composite image based on the image object and the opacity mask. Other embodiments of this aspect include corresponding systems, apparatus, and computer program products.

Another aspect of the subject matter described in this specification can be embodied in a system that includes a user interface device; and one or more computers operable to blend an image object having a shape and directional information with one or more images, such that opacity values in the blended image object are different going from edge to interior of the shape. The blending can be achieved in accordance with the shape and the directional information of the image object. The one or more computers can be operable to dynamically create an opacity mask using a raster-based image and based on the shape of the image object and resolution and size of the user interface device. The one or more computers can also be operable to process the opacity mask in accordance with the directional information of the image object.

These and other embodiments can optionally include one or more of the following features. The image object can be one of a vector-based artwork, a raster-based artwork, a text, a line, a digital image, an image in encapsulated PostScript (EPS) format, and an image in portable document format (PDF). The creation of the opacity mask can be done dynamically using a raster-based image such that the raster-based image is based on resolution and size of the output device. The creation and processing of the opacity mask can include generating a virtual mask representation. The processing of the opacity mask can be further based on user-specified widths for the edges of the shape such that the widths are different for a first of the edges with respect to a second of the edges. Furthermore, the processing of the opacity mask can be based on a user-specified angle such that the shape of the image object is rotated by the angle before creating the opacity mask. The opacity mask can then be rotated by a negative value of the angle before compositing with the image object and the one or more images. The opacity values in the opacity mask can be determined in accordance with a weighted average diffusion propagation. The diffusion propagation can further be defined in accordance with user-specified propagation rates such that the rates are different for a first of the edges with respect to a second of the edges.

The edges of the shape can be detected by a line-by-line or column-by-column scan such that the opacity values in the opacity mask are determined in accordance with ramping information. The scan can identify an antialias value for a first encountered nonzero pixel and incorporate the antialias value into the ramping information such that the processed opacity mask does not have jagged edges. The scan can also identify a leading edge and one or more additional edges in the same line or the same column. The scan can be performed as a row scan or a column scan.

The one or more computers can include a server operable to interact with the user interface device through a data communication network, and the user interface device can be operable to interact with the server as a client. The user interface device can include a computer running a Web browser, a mobile telephone running a wireless application protocol (WAP) browser, or a personal digital assistant (PDA) running a WAP browser. Moreover, the one or more computers can include one personal computer, and the personal computer can include the user interface device.

Particular embodiments of the subject matter described in this specification can be implemented to realize one or more of the following advantages. An easy-to-use, one-step, object-attribute-based directional feather can be achieved in which only the specified edge or edges of an image object are feathered. Simple image objects (e.g., a rectangle or a circle) can be readily feathered on a single side without employing a traditional manual approach of modifying a copy of the image in a separate image editing application so that its alpha channel encodes the desired effect and then placing the modified image back into a graphics layout application, where the two images (the original image object and the modified image) are composited or merged together.

In addition, a feathering effect can be readily generated for multiple edges or a complex image object with nonlinear edges. For example, feathering of more than one and less than all of the edges of a complex image object can be readily produced. Different edges can be feathered by different widths to create a sophisticated feathering effect, and nonlinear edges of an image object (e.g., an S-shaped curve) can be readily and rapidly feathered using a straight forward user interface, without requiring potentially cumbersome and error prone user operations (e.g., manually tracing the edge with a soft-edge eraser tool in the two step manual process mentioned above, which can produce irregular results). Moreover, a feathered edge can be established that follows the contour of an object, but only along designated directions, or faces, of the object. Implementations can automatically trace the specified edge (or edges) of the object, whether they are straight line or irregular.

Further, the directional feathering can be done without modifying the original image object, because an opacity mask can be applied externally to the image object to accomplish the feathering. A vector-based image object need not be rasterized; rather, only the opacity mask need be rasterized. This is because the feathering process need be performed on the opacity mask and not the vector-based image. Moreover, the file that represents the image object need not be modified since the dynamically generated opacity mask can be applied within the compositing application. That is to say, the image object is blended with the background object during the compositing process, and not the feathering process. Thus, there is no need for tracking additional files and if a different image object is to be substituted, an opacity mask can be dynamically generated. Some embodiments eliminate workflow steps and reliance on operator skill and problem-solving abilities to create directional feathers for an image object. The need to use an external application and its tool set to modify the image object can be eliminated.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
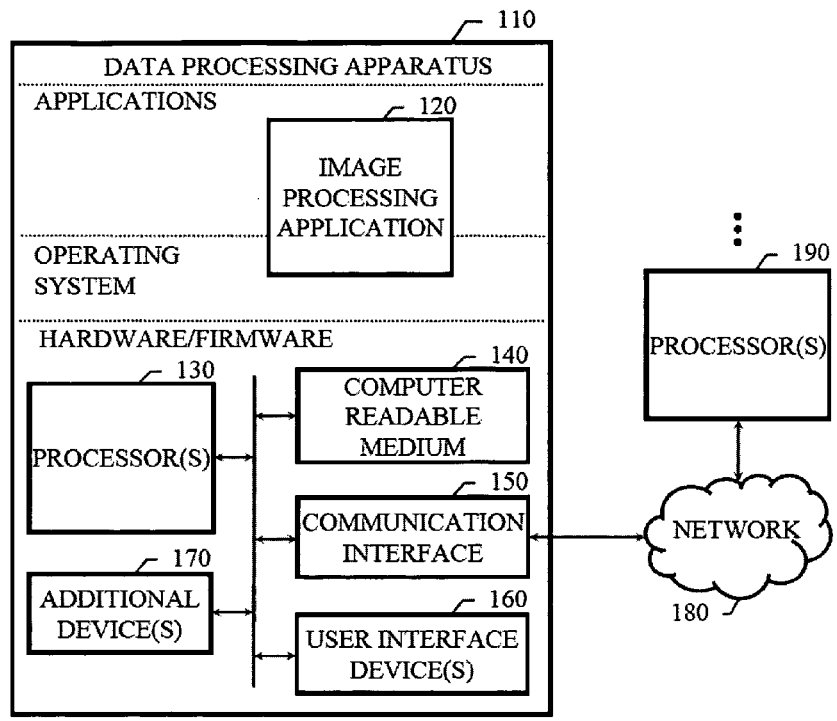
FIG. 1 shows an example system configured to output a directionally-feathered image by compositing an image object and its opacity mask, with a background image.

FIG. 1 shows an example system configured to output a directionally-feathered image by compositing an image object and its opacity mask, with a background image. A data processing apparatus 110 can include hardware/firmware, an operating system and one or more applications, including an image processing application 120. As used herein, an application refers to a computer program that the user perceives as a distinct computer tool used for a well-defined purpose. An application 120 can be built entirely into the operating system (OS) of the data processing apparatus 110, or an application 120 can have different components located in different locations (e.g., one portion in the OS or kernel mode, one portion in the user mode, and one portion in a remote server), and an application 120 can be built on a runtime library serving as a software platform of the apparatus 110. Moreover, an application 120 can be a graphical user interface application (e.g., a Web browser) that connects to one or more processors 190 (e.g., one or more Web servers) over a network 180 and provides the computer tool as a network service.

The image processing application 120 can include visual effects software (e.g., Adobe® After Effects® software, available from Adobe Systems Incorporated of San Jose, Calif.), image editing software (e.g., Adobe® Photoshop® software, available from Adobe Systems Incorporated of San Jose, Calif.), and video editing software (e.g., Adobe® Premiere® software, available from Adobe Systems Incorporated of San Jose, Calif.). Thus, the image processing application 120 can operate on digital images from many different sources. Moreover, a digital image (which for brevity will simply be referred to as an image) does not necessarily correspond to a file. An image may be stored in a portion of a file that holds other images, in a single file dedicated to the image in question, or in multiple coordinated files.

The data processing apparatus 110 includes one or more processors 130 and at least one computer-readable medium 140. The data processing apparatus 110 can also include a communication interface 150, one or more user interface devices 160, and one or more additional devices 170. The user interface device(s) 160 can include display screen(s), keyboard(s) (e.g., a custom video editing keyboard), mouse, stylus, or any combination thereof. Moreover, the data processing apparatus 110 can itself be considered a user interface device (e.g., when the image processing application 120 is delivered as a Web service).

The additional device(s) 170 can include various devices used for video and film editing. This can include a video controller coupled to a video recorder (which can be used for storing and importing video footage and for writing final output), a sound system, and a battery backup. Moreover, the subject matter described in this specification can be used in conjunction with any digital print engine or marking engine, display monitor, or other raster output device capable of producing color or gray scale pixels on paper, film, display screen, or other output medium.

Once properly programmed, the data processing apparatus 110 is operable to output a directionally-feathered image by compositing (i.e., merging) an image object and its opacity mask, with a background image. Both the image object and the background image may include vector-based artwork, raster-based artwork, a text font, a line, a digital image, an image in EPS format, or an image in PDF format. For example, the image object may be a text in a vector format and the background image may be a rasterized digital image.

Figure 2:
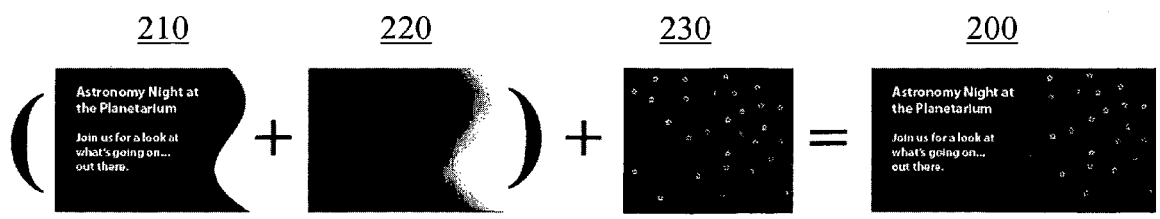
FIG. 2 shows an example directionally-feathered image created by compositing an image object and its opacity mask along with a background image.

FIG. 2 shows an example directionally-feathered image 200 created by compositing an image object 210 and its opacity mask 220 along with a background image 230.

Figure 3:
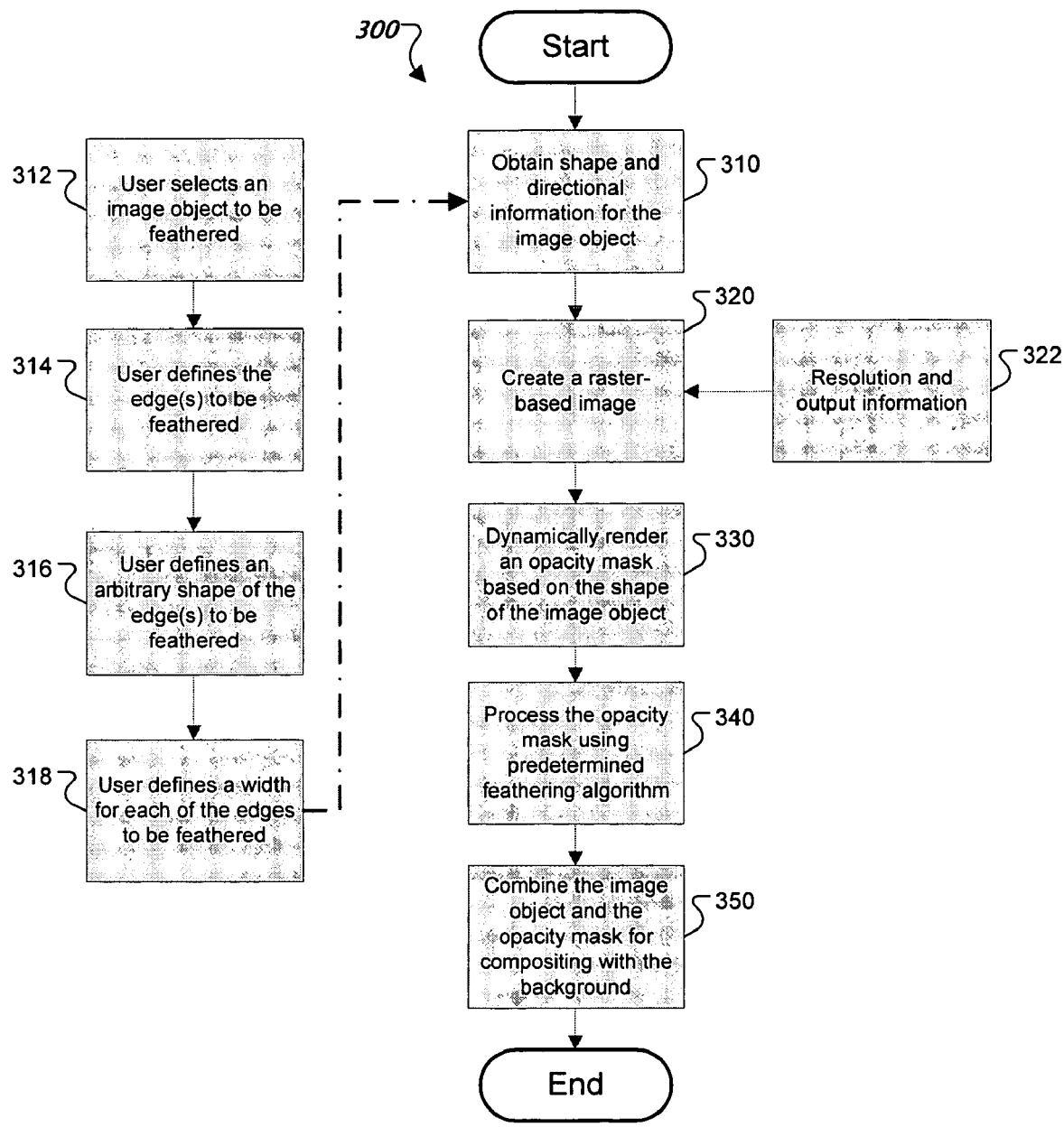
FIG. 3 is a flow chart showing an example process of directional feathering of an image object, using a dynamically created opacity mask and a predetermined feathering algorithm.

FIG. 3 is a flow chart showing an example process 300 of directional feathering of the image object 210, using a dynamically-created opacity mask 220 and a predetermined feathering function. A set of user-specified shape and direction information are obtained 310 for the image object 210. The shape and directional information for the image object can be specified in a graphics layout application. For example, in a graphics layout environment, a user selects 312 the image object 210 to be feathered. The user defines 314 an arbitrary shape and specifies 316 desired edges of the shape to be feathered. For instance, using a Bezier curve tool, the user may define a curve-like shape for the image object 210. Further, the user may also define 318 a width (e.g. number of pixels to be feathered) for each of the desired edges.

Once the shape and directional information for the image object are obtained 310, the data processing apparatus 110 then creates 320 a raster-based image with one alpha channel, or one alpha channel plus the minimum color or grayscale channels needed for typical raster processing engines. The raster-based image can be created by obtaining 322 the resolution and output information of the output device. This information would vary depending on whether the composite image is being rendered to screen or print. For example, if rendering to a computer screen is desired, then the resolution of the monitor will be considered when creating the raster-based image. The image object 210 can then be rendered 330 into an opacity mask 220 using the raster-based image. The opacity mask 220 can be a grayscale representation of the color and a single-channel representation of the alpha values in the image object. The grayscale data of the rendered opacity mask 220 can then be discarded because the color information need not be used in the feathering process, and in some implementations the grayscale data is not generated in the first place. For better feathering effect, the rendering 330 of the opacity mask can be performed with antialiasing functionality, which is discussed further below.

The opacity mask 220 can be rendered dynamically according to the shape of the image object 210 and based on the resolution and the display medium of the user interface device 160. The opacity mask 220 is processed 340 using a predetermined feathering algorithm to obtain the desired directional feathering effects with opacity values in the opacity mask that are different going from the edge to the interior. Once the opacity mask has been processed 340, it is combined 350 with the image object 210 as a soft mask and then composited with the background image 230 to create the directionally-feathered image object 200. The result is that the image object 210 is blended against the background image 230 using the alpha information from the opacity mask 220.

Figure 4:
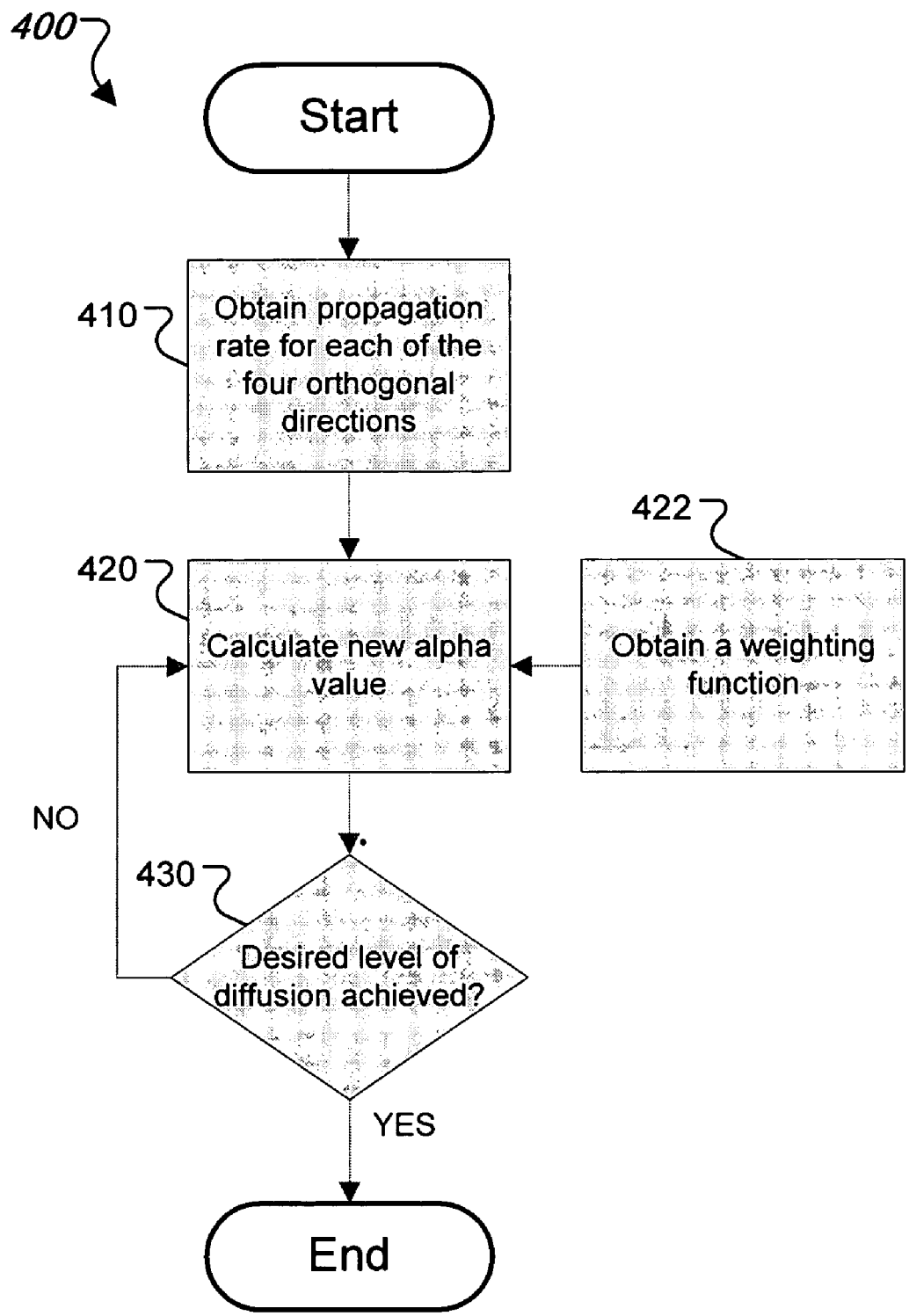
FIG. 4 is a flow chart showing an example process for creating directional feathering effects using a weighted-average diffusion algorithm.

FIG. 4 is a flow chart showing an example process 400 for creating a directional feathering effect using a weighted-average diffusion algorithm. A diffusion algorithm simulates how heat, density, or other scalar quantity propagates from a fixed potential edge into an interior where the property is initially zero everywhere. Typically the propagation is uniform in all directions, but the propagation can be non-uniform by obtaining 410 the propagation rate for each of the four orthogonal directions. For example, the propagation rate may be such that from left to right is 0, from right to left is 1, from top to bottom is 2, and from bottom to top is 0. The resulting diffusion propagation feathers the top edge by twice as much as the right edge, and the left and bottom edges not at all.

The diffusion algorithm calculates 420 the new alpha value for each variable potential cell (pixel) as a function of its current value and those of the surrounding cells. This can be an average of the orthogonally adjacent cells and the current cell value. A directional feather can be achieved by obtaining 422 a weighting function to take into account directional dependence. For example, instead of averaging all directions equally, one could weight the top at twice the bottom, and the left and right not at all; i.e., the diffusion can propagate in the vertical dimensions and even then not equally. The process is repeated over a number of iterations 430 until the desired level of diffusion is achieved.

Figure 5:
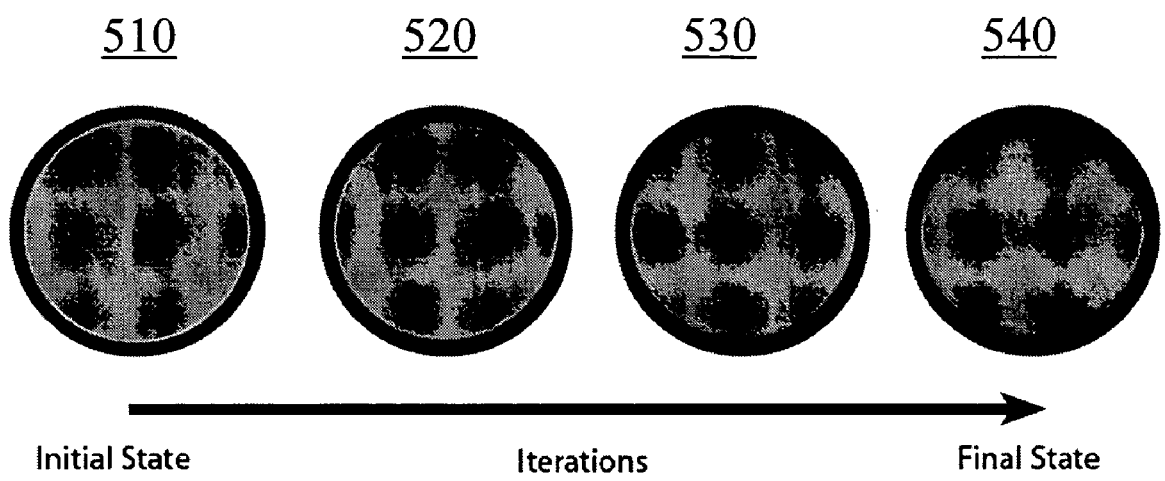
FIG. 5 shows an example graphical representation of the diffusion profile using a directional weighted-average diffusion algorithm.

FIG. 5 shows an example graphical representation of the diffusion profile using a directional weighted-average diffusion algorithm. The initial state 510 depicts a region of higher concentration near the outer edge of the circle. As the directional weighted-average diffusion process is iterated 520 and 530, the resulting concentration profile 540 shows that the diffusion from the top occurs at twice the rate of the bottom, and no diffusion occurs on the sides. The benefit of the weighted-average diffusion algorithm is the precise control over the weighting scheme to achieve a high-quality feathering effect. The weighted-average diffusion algorithm can produce the high-quality directional feathering effects, albeit with additional costs in terms of computational time and/or memory space.

Figure 6:
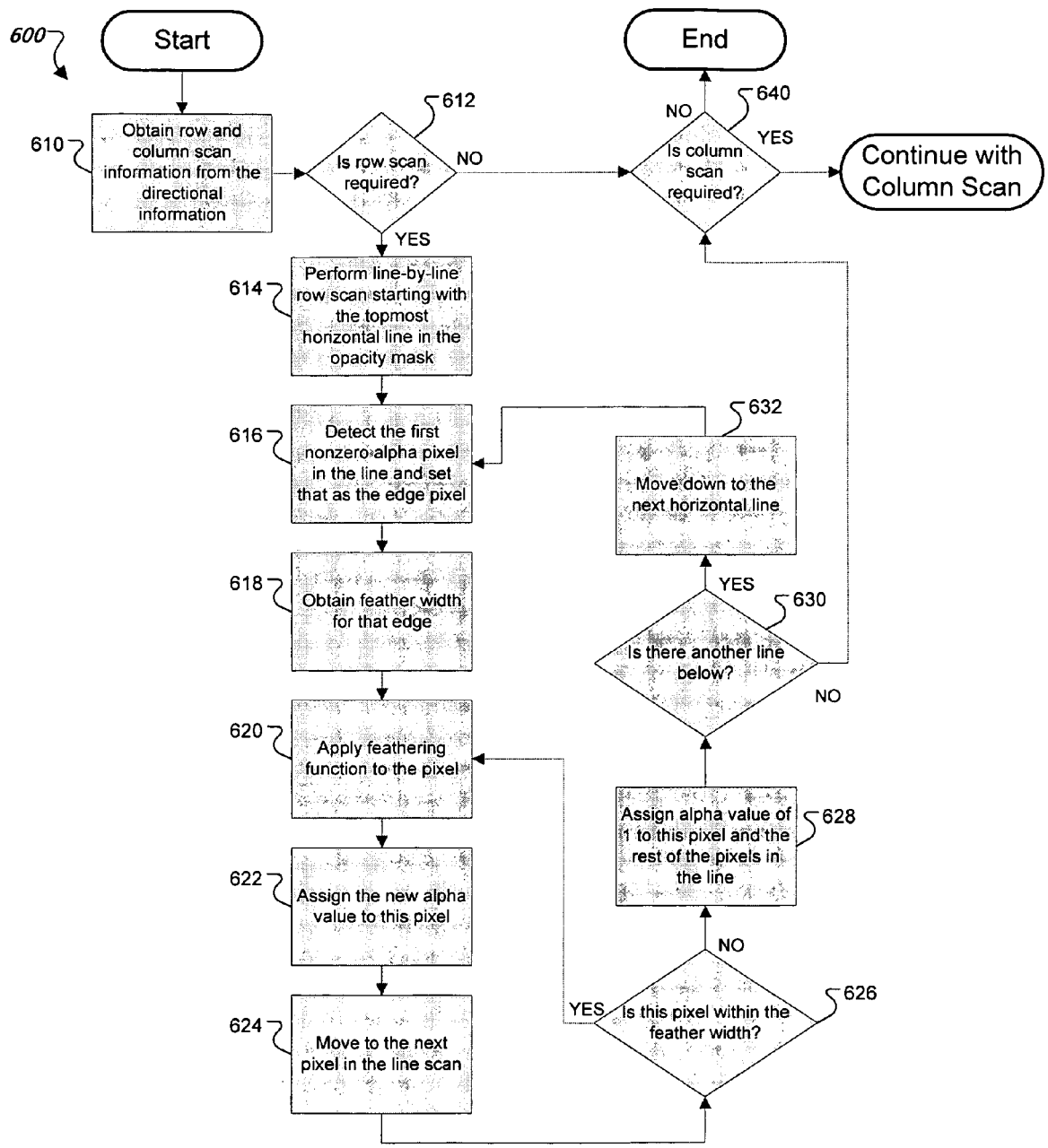
FIG. 6 is a flow chart showing an example process for creating a directional feathering effect using a scanline algorithm.

FIG. 6 is a flow chart showing an example process 600 for creating a directional feathering effect using a scanline algorithm. The scanline algorithm is a simpler alternative to the weighted diffusion algorithm and involves less computational time and memory space. Process 600 first obtains 610 the row and the column scan information from the directional information. The scanline algorithm performs a line-by-line scan of each row or a column-by-column scan of each column (depending on which side is being feathered) independently. Having determined 612 from the directional information that row scans are required, a line-by-line row scan is performed starting with the topmost horizontal line in the opacity mask 220. The row scan 614 then detects 616 the first nonzero alpha pixel in the line and sets that pixel as the edge pixel. Once the edge pixel for that row is detected 616, the feather width for that edge is obtained 618. Next, process 600 applies 620 a feather function to the edge pixel.

Figure 7:
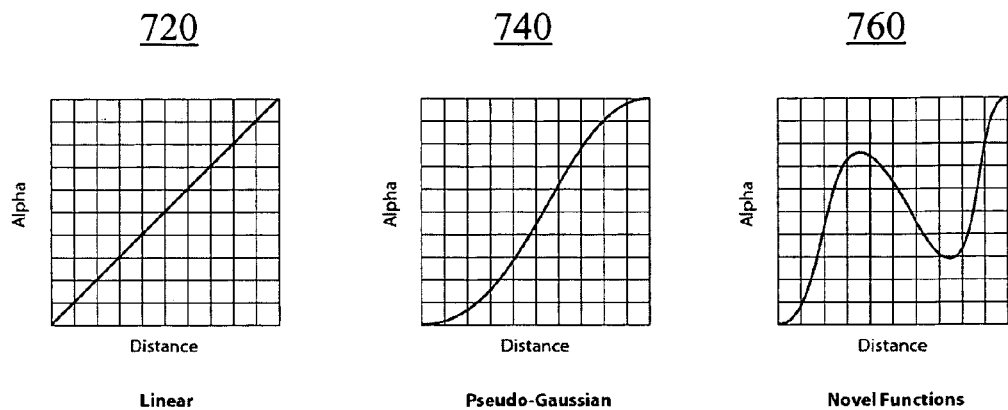
FIG. 7 shows example feather functions used in the scanline algorithm.

FIG. 7 shows example feather functions used in the scanline algorithm. The feather function accepts a nonnegative pixel distance and produces an alpha value for those pixels located within the pixel distance from the edge. This can be a linear function 720 if the feather should have linear characteristics, or a pseudo-Gaussian function 740 can be used. The pseudo-Gaussian function 740 is developed in a canonical unit square, which is then scaled according to the feather width in number of pixels. Note also that the feather function can be an arbitrary curve 760.

Once the feather function is applied 620 to the pixel, a new alpha value is assigned 622 to that pixel according to the feather function. The row scan is then moved 624 to the next pixel in the line scan. This process 620 is carried out iteratively 626 until all the pixels within the feather width have been processed 620 with the feather function. After that, an alpha value of 1 is assigned 628 to all the pixels outside of the feather width. Once a row has been completed and an adjacent row below has been detected 630, the process 600 moves down 632 to the next row. At this point, the first nonzero alpha pixel in that new row is detected 616 and the process 600 repeats itself until the rows in the opacity mask have been scanned. If column scan is also required 640, then the whole scanline process 600 is performed in a column-by-column fashion similar to what has been described above.

The scanline feature supports independent left, right, top, and bottom feathering with varying feather widths. When more than one feather widths are specified, the results are calculated independently and if there is an overlap of alpha values (e.g., near the corner), the minimum alpha can be selected. For example, if a square is feathered from both the right and top sides, the upper-right corner will be affected by both feathers. In that region, the smaller of the alphas produced by the two functions can be used.

Figure 8:
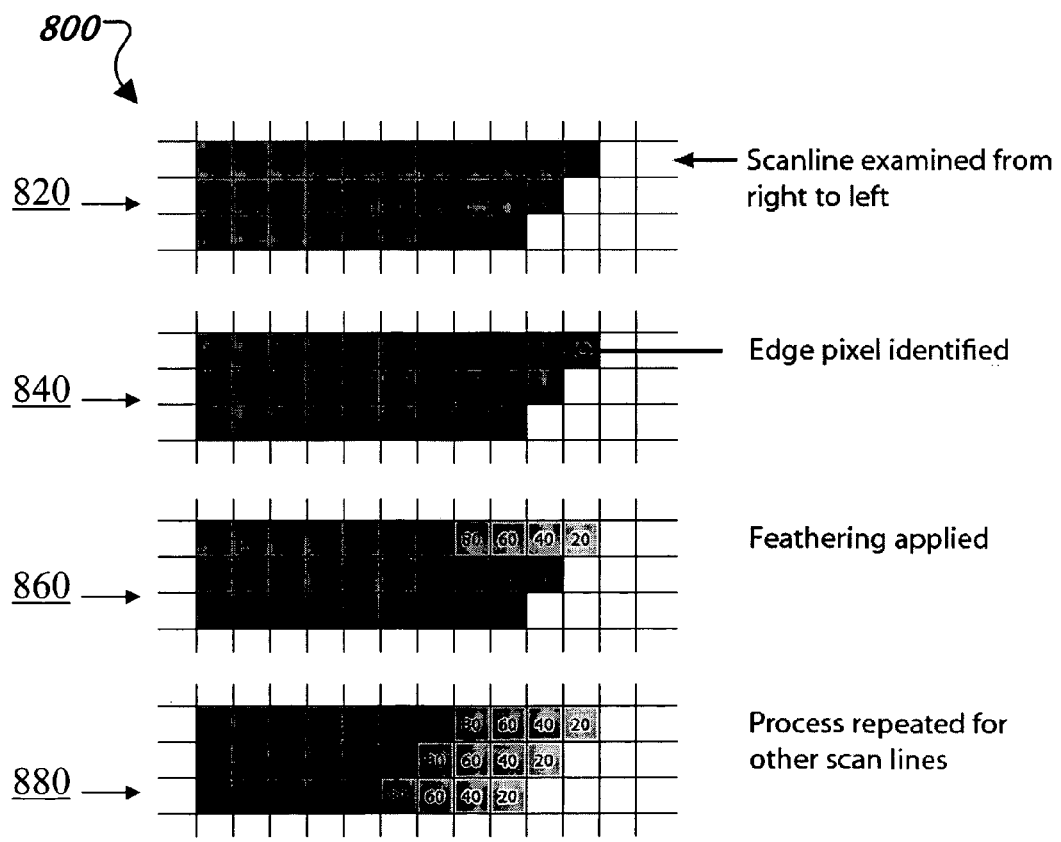
FIG. 8 shows an example pixel representation of the scanline process zoomed-in near an edge of the image object.

FIG. 8 shows an example pixel representation of the scanline process 800 zoomed-in near an edge of the image object 210. First, the scanline values are examined 820 one pixel at a time from right to left. Whenever a nonzero alpha pixel is identified 840, such pixel is assigned to be the edge pixel. The feather function (in this case, a linear function 720) is then applied 860 starting at the edge pixel. Once the feathering is completed for that line, the remainder of the pixels in the scanline can be set to 100% alpha. The process is repeated 880 to all the other rows and produces a feathering effect with opacity values in the opacity mask that are different going from the edge to the interior.

Figure 9:
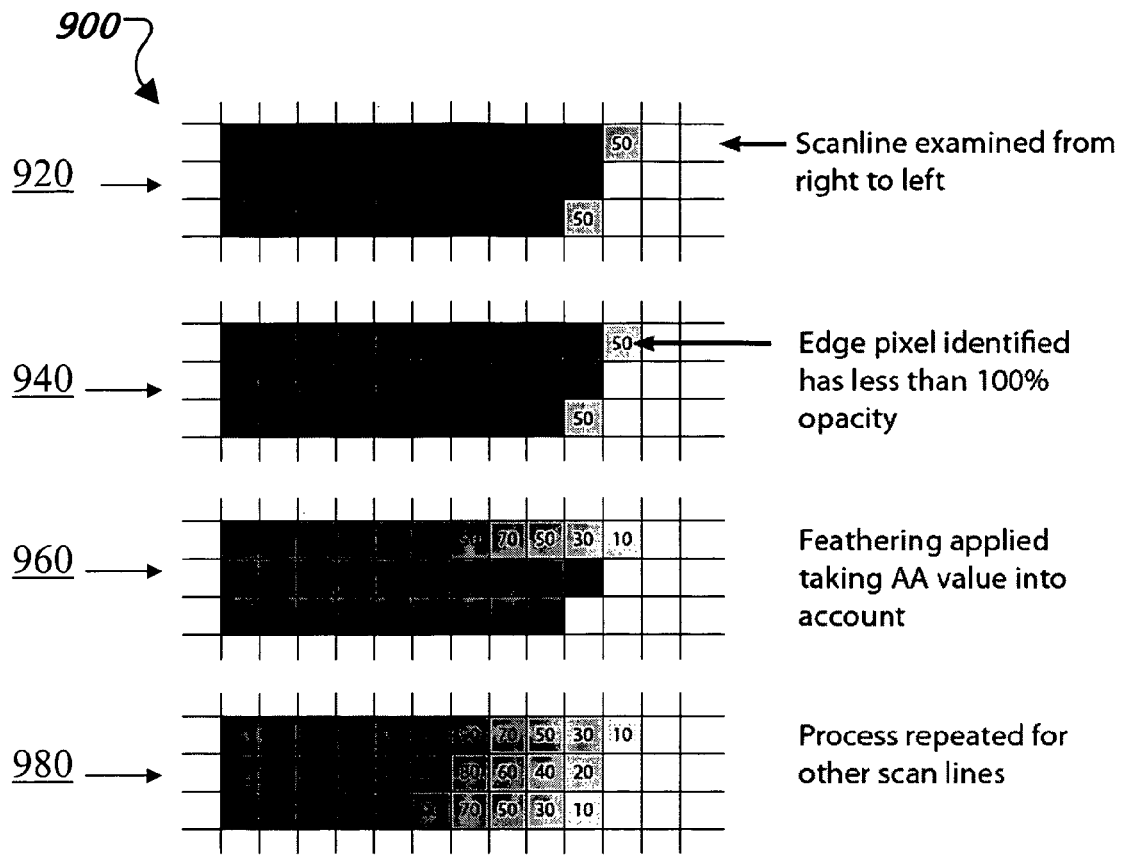
FIG. 9 shows an example pixel representation of the scanline process zoomed-in near an edge of the image object and incorporating the antialias values of the opacity mask.

FIG. 9 shows an example pixel representation of the scanline process 900 zoomed-in near an edge of the image object 210 and incorporating the antialias values of the opacity mask. Antialiasing refers to the use of partial-alpha pixels at the edges of the objects to reduce the appearance of jagged edges when a vector object is rasterized. An enhanced scanline algorithm takes advantage of this information by considering the alpha value of the first nonzero alpha pixel. First, the scanline values are examined 920 one pixel at a time from right to left. Whenever a nonzero alpha pixel is identified 940, such pixel is assigned to be the edge pixel. In this case, the alpha value of the edge pixel has less than 100% opacity. For example, if the vector object only overlaps with 50% of the pixel, then the edge pixel would have a 50% alpha value. As a result, the edge is really half a pixel in from the pixel's edge. The enhanced scanline algorithm takes this into account when applying the feather function 960 and calculating the resulting alpha feathering ramp. For this simple example a linear ramp 720 is assumed. In general the algorithm uses a shaped curve as a function of X, which is the number of pixels in from the edge; thus, the antialias enhancement biases X by the alpha percentage of the first pixel. The result is a much smoother appearance along the feathered edge. A 'bias' variable biases the feather function input by the fraction of a pixel indicated by the initial antialias alpha value. This scanline process is then iterated 980 for other scan lines to achieve a feathering effect that takes into account the antialias values of the edge pixels in the opacity mask.

Figure 10:
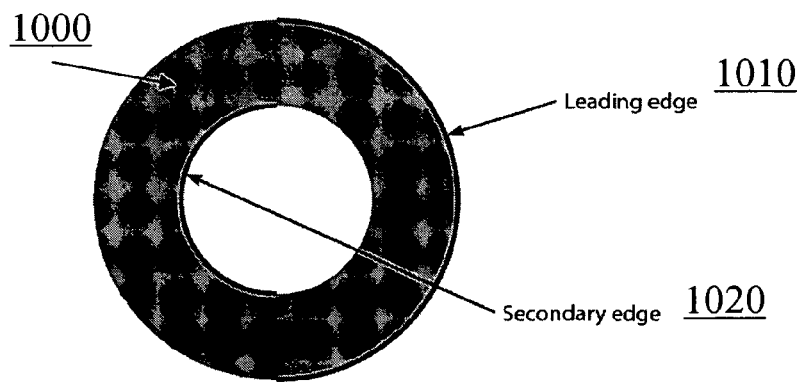
FIG. 10 shows an example image object having a leading edge and secondary edges in the scanline process.
Figure 11:
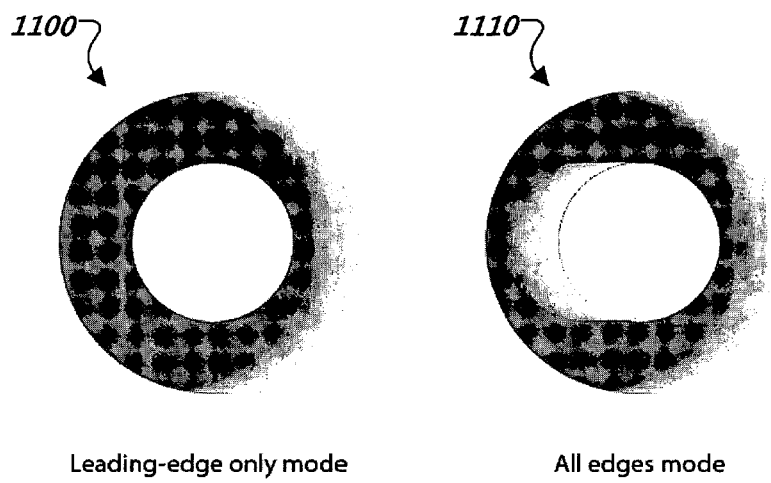
FIG. 11 shows example feathered images using the scanline process with a leading-edge-only feathering and an all-edges feathering.

Thus far, the scanline algorithm has been described for an image object having only one leading edge. However, the scanline algorithm can also be applied to image objects having a leading edge and multiple secondary edges. FIG. 10 shows an example image object 1000 having a leading edge 1010 and a secondary edge 1020 in the scanline process. In the case of image object 1000, the user may desire to feather just the leading edge or all the edges of the image object. Consider the example from a right-hand-edge perspective. It may not be clear whether the user of the scanline feature will expect the secondary edge to be feathered or only the leading edge. Thus, a further capability of the scanline algorithm allows a user control over how to handle leading versus secondary edges. FIG. 11 shows example feathered images using the scanline process with a leading-edge-only feathering 1100 and an all-edges feathering 1110.

Figure 12:
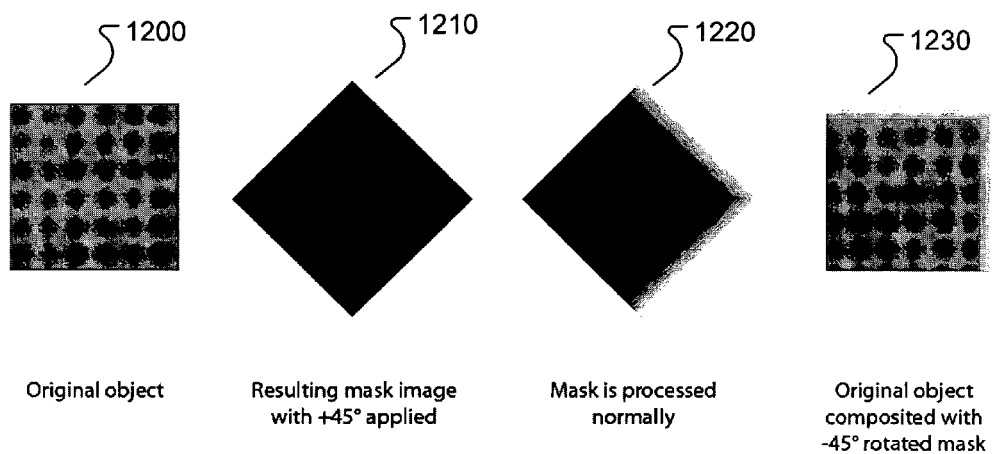
FIG. 12 shows an example scanline feathering process to achieve directional feathering for a specified angle of 45 degrees.

Additionally, both the weighted average diffusion algorithm and the scanline algorithm allow for further enhancements. For example, the frame of reference can be rotated to produce an angled feathering effect. FIG. 12 shows an example feathered image using the scanline algorithm with angled feathering. For example, a user may desire to feather an image object 1200 only with a 45 degree angle. Thus, the right and top edges of the image object 1200 should be feathered. To achieve the angled feathering effect, an additional angle input (in this case, 45 degrees) is obtained. For a given angle, the image object 1200 is rotated during the rendering stage to produce 1210 a rotated opacity mask. The opacity mask is then processed 1220 according to the scanline algorithm of line-by-line scanning process. When compositing the original image object 1200 with the opacity mask 1210, the mask is rotated back by the negative angle to produce the angled feathering effect shown in the composite image 1230.

Furthermore, a slightly more complex two-pass scanline algorithm can be implemented to achieve the feathering process. As discussed above, the scanline algorithm utilizes one read (for detecting the alpha value) and one write (for assigning the alpha value) of the pixel data for each direction that is being feathered. This process can be accomplished on the fly given sufficient random access memory (RAM) space in the data processing apparatus 110. However, in some cases the RAM can have insufficient space to cache all the pixels in the raster-based opacity mask and a slower, disk-based storage device (e.g., hard drive) is used for reading and writing of the pixel data. When this occurs, the algorithm can perform a single read and write for each pixel, regardless of the number of directions being feathered.

Figure 13:
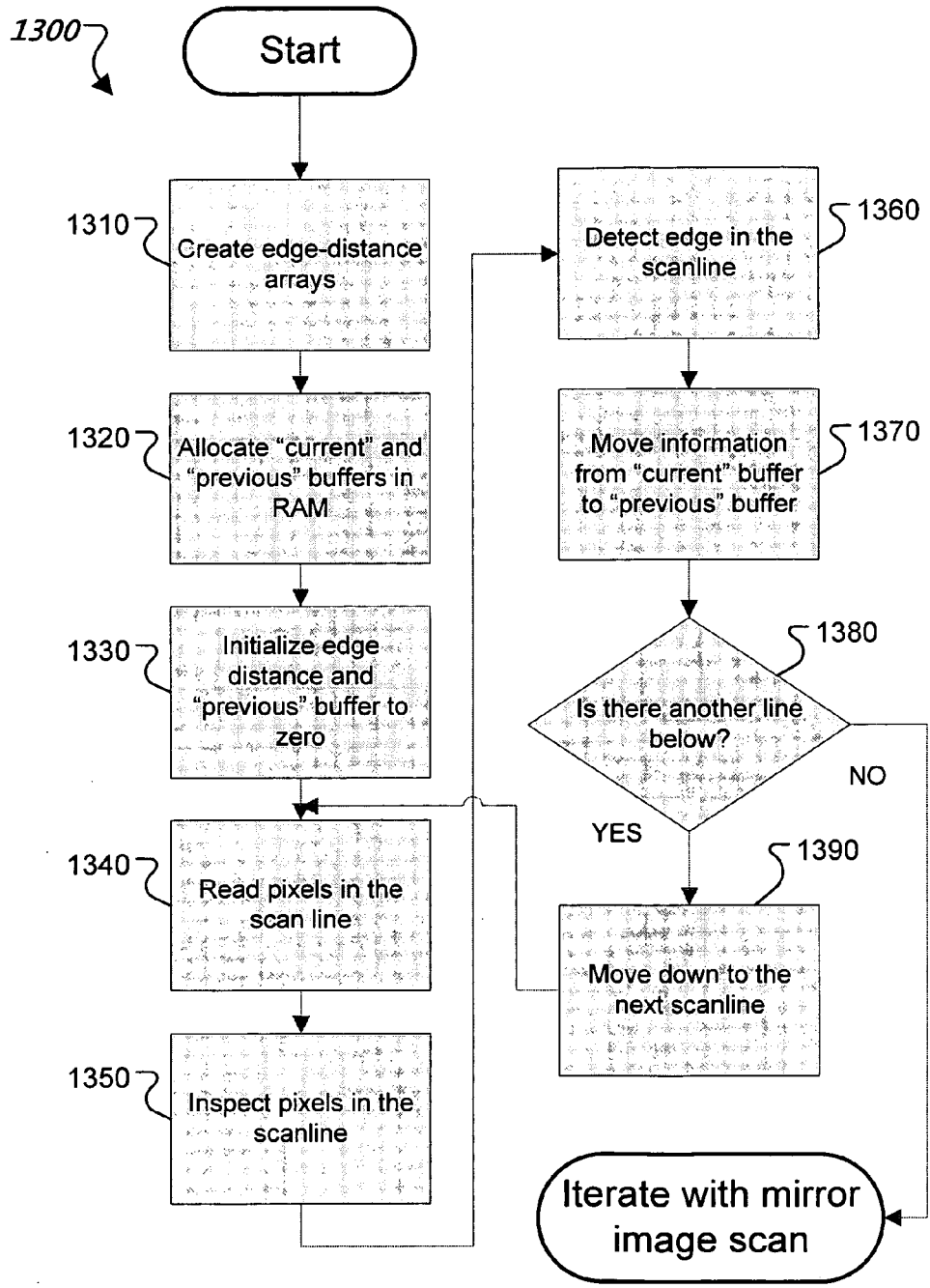
FIG. 13 is a flow chart showing an example first-pass process for creating a directional feathering effect using a two-pass scanline algorithm.

FIG. 13 is a flow chart showing an example first-pass process 1300 for creating a directional feathering effect using a two-pass scanline algorithm. The two-pass scanline algorithm accomplishes the single-read and single-write process by creating an array of edge locations in the first (read) pass and then using that information to form the feathered result in the second (write) pass. In the first pass, an array of edge distances is created 1310 for each applicable feathering direction. The sizes of the edge-distance arrays can be based on the width (for top/bottom edges) or height (for left/right edges) of the raster-based opacity mask. A "current" scanline buffer and a "previous" scanline buffer are allocated 1320 in the RAM to store the edge information of the opacity mask. This is an example of a virtual opacity mask since the full mask need not be generated and stored in memory.

Initially, the edge distances and the "previous" buffer are set 1330 to zero. The algorithm reads 1340 each scanline into the "current" buffer and then inspects 1350 those pixels from left to right. The pixel being inspected is compared to the preceding pixel to the left as well as the pixel above in the prior scanline. An edge is detected 1360 when there is a zero-to-nonzero or nonzero-to-zero transition, and the edge-distance array entries are updated accordingly. At the end of the scanline, the information stored in the "current" buffer is moved 1370 to the "previous" buffer (by swapping references) and if 1380 there is another scanline the process repeats 1390 for the next scanline. When the last scanline has been processed, one additional iteration is performed by initializing "current" buffer values to zeros in a mirror image fashion with respect to the first scanline.

Thus, at the end of the first pass 1300, the rater-based opacity mask has been read once, and the coordinates of all edges of a virtual opacity mask have been identified and stored in the edge-distance array. Certain options can be applied to the two-pass scanline algorithm to speed up the process. For example, if a given direction is not feathered then no edge distance array need be created for that particular direction. Similarly, if there is no top/bottom feathering then the "previous" buffer need not be used because no scanline-to-scanline comparisons need be made.

In the second pass the edge-distance arrays created from the first pass are used to build the final raster in a single write pass. At each pixel in the raster, the coordinates are compared against the edge distances in each applicable feathering direction. Based on that information the alpha value of the pixel can be set to 1, 0, or a value determined according to the feather function discussed above. The minimum value of each direction's results is calculated and assigned to the pixel. This operation is carried out one scanline at a time, and as each scanline is completed, it is written to the raster-based opacity mask. Therefore, the two-pass algorithm produces similar feathering results as the basic scanline algorithm described above; however, a virtual opacity mask is used due to the insufficient RAM space.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, the opacity mask can be virtual in that the appropriate opacity values can be calculated and applied dynamically in the feathering process, without requiring an actual mask to be allocated in memory.

What is claimed is:

1. A computer-implemented method comprising:
   obtaining an image object and directional information for the image object, the object including a shape having edges;
   creating an opacity mask for the image object based on the shape of the image object;
   processing the opacity mask such that opacity values in the opacity mask are different going from edge to interior of the shape, the processing in accordance with the directional information of the image object, where the directional information indicates different amounts of feathering for different edges of the shape; and
   outputting a composite image based on the image object and the opacity mask.

2. The method of claim 1, wherein the image object is one of a vector-based artwork, a raster-based artwork, a text, a line, a digital image, an image in EPS format, and an image in PDF format.

3. The method of claim 1, wherein the creating of the opacity mask comprises dynamically generating a raster-based image based on resolution and size of an output device.

4. The method of claim 1, wherein the creating and the processing of the opacity mask comprises generating a virtual mask representation.

5. The method of claim 1, wherein the processing of the opacity mask comprises applying user-specified widths for the edges of the shape such that the widths are different for a first of the edges with respect to a second of the edges.

6. The method of claim 1, wherein the processing of the opacity mask comprises applying user-specified angle for rotating the shape of the image object before the creating of the opacity mask.

7. The method of claim 6, wherein the outputting of the composite image comprises rotating the opacity mask by a negative value of the user-specified angle before the compositing with the image object.

8. The method of claim 1, wherein the processing of the opacity mask comprises determining the opacity values in accordance with a weighted average diffusion propagation.

9. The method of claim 8, wherein the diffusion propagation comprises applying user-specified propagation rates such that the rates are different for a first of the edges with respect to a second of the edges.

10. The method of claim 1, wherein the processing of the opacity mask comprises detecting the edges of the shape by a scan; and determining the opacity values in accordance with ramping information.

11. The method of claim 10, wherein the scan comprises identifying an antialias value for a first encountered nonzero pixel; and incorporating the antialias value into the ramping information such that the processed opacity mask does not have jagged edges.

12. The method of claim 10, wherein the scan identifies a leading edge and one or more additional edges in the same line.

13. The method of claim 10, wherein the scan comprises a row scan and a column scan.

14. A computer program product, encoded on a non-transitory computer-readable medium, operable to cause a data processing apparatus to perform operations comprising:
   obtaining an image object and directional information for the image object, the object including a shape having edges;
   creating an opacity mask for the image object based on the shape of the image object;
   processing the opacity mask such that opacity values in the opacity mask are different going from edge to interior of the shape, the processing in accordance with the directional information of the image object, where the directional information indicates different amounts of feathering for different edges of the shape; and
   outputting a composite image based on the image object and the opacity mask.

15. The computer program product of claim 14, wherein the image object is one of a vector-based artwork, a raster-based artwork, a text, a line, a digital image, an image in EPS format, and an image in PDF format.

16. The computer program product of claim 14, wherein the creating of the opacity mask comprises dynamically generating a raster-based image based on resolution and size of an output device.

17. The computer program product of claim 14, wherein the creating and the processing of the opacity mask comprises generating a virtual mask representation.

18. The computer program product of claim 14, wherein the processing of the opacity mask comprises applying user-specified widths for the edges of the shape such that the widths are different for a first of the edges with respect to a second of the edges.

19. The computer program product of claim 14, wherein the processing of the opacity mask comprises applying user-specified angle for rotating the shape of the image object before the creating of the opacity mask.

20. The computer program product of claim 19, wherein the outputting of the composite image comprises rotating the opacity mask by a negative value of the user-specified angle before the compositing with the image object.

21. The computer program product of claim 14, wherein the processing of the opacity mask comprises determining the opacity values in accordance with a weighted average diffusion propagation.

22. The computer program product of claim 21, wherein the diffusion propagation comprises applying user-specified propagation rates such that the rates are different for a first of the edges with respect to a second of the edges.

23. The computer program product of claim 14, wherein the processing of the opacity mask comprises detecting the edges of the shape by a scan; and determining the opacity values in accordance with ramping information.

24. The computer program product of claim 23, wherein the scan comprises identifying an antialias value for a first encountered nonzero pixel; and incorporating the antialias value into the ramping information such that the processed opacity mask does not have jagged edges.

25. The computer program product of claim 23, wherein the scan identifies a leading edge and one or more additional edges in the same line.

26. The computer program product of claim 23, wherein the scan comprises a row scan and a column scan.

27. A system comprising:
a user interface device; and
one or more computers operable to interact with the user interface device and to blend an image object having a shape and directional information with one or more images, such that opacity values in the blended image object are different going from edge to interior of the shape, wherein the blending in accordance with the shape and the directional information of the image object, and the directional information indicates different amounts of feathering for different edges of the shape.

28. The system of claim 27, wherein the one or more computers operable to dynamically generate an opacity mask using a raster-based image and based on the shape of the image object and resolution and size of the user interface device.

29. The system of claim 28, wherein the one or more computers operable to process the opacity mask in accordance with the directional information of the image object.

30. The system of claim 29, wherein the one or more computers operable to generate and to process the opacity mask by generating a virtual mask representation.

31. The system of claim 29, wherein the one or more computers operable to process the opacity mask based on user-specified widths for the edges of the shape such that the widths are different for a first of the edges with respect to a second of the edges.

32. The system of claim 29, wherein the one or more computers operable to process the opacity mask based on user-specified angle for rotating the shape of the image object before the creating of the opacity mask.

33. The system of claim 32, wherein the one or more computers operable to output the composite image by rotating the opacity mask by a negative value of the user-specified angle before the compositing with the image object.

34. The system of claim 27, wherein the one or more computers operable to process the opacity mask by determining the opacity values in accordance with a weighted average diffusion propagation.

35. The system of claim 34, wherein the one or more computers operable to perform the diffusion propagation by applying user-specified propagation rates such that the rates are different for a first of the edges with respect to a second of the edges.

36. The system of claim 27, wherein the one or more computers operable to process the opacity mask by detecting the edges of the shape by a scan and by determining the opacity values in accordance with ramping information.

37. The system of claim 36, wherein the one or more computers operable to perform the scan by identifying an antialias value for a first encountered nonzero pixel and by incorporating the antialias value into the ramping information such that the processed opacity mask does not have jagged edges.

38. The system of claim 36, wherein the one or more computers operable to perform the scan by identifying a leading edge and one or more additional edges in the same line.

39. The system of claim 36, wherein the one or more computers operable to perform a row scan or a column scan.

40. The system of claim 27, wherein the one or more computers comprise a server operable to interact with the user interface device through a data communication network, and the user interface device is operable to interact with the server as a client.

41. The system of claim 40, wherein the user interface device comprises a personal computer running a Web browser, a mobile telephone running a WAP browser, or a PDA running a WAP browser.

42. The system of claim 27, wherein the one or more computers comprises one personal computer, and the personal computer comprises the user interface device.

* * * * *